US006503862B1

(12) United States Patent
Yamamoto

(10) Patent No.: US 6,503,862 B1
(45) Date of Patent: Jan. 7, 2003

(54) EXHAUST GAS PURIFYING CATALYST

(75) Inventor: Shinji Yamamoto, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 48 days.

(21) Appl. No.: 09/617,491

(22) Filed: Jul. 14, 2000

(30) Foreign Application Priority Data

| Feb. 1, 2000 | (JP) | 2000-023536 |
| Jul. 6, 2000 | (JP) | 2000-205382 |

(51) Int. Cl.[7] .................. B01J 29/40; B01J 29/08; B01J 29/18
(52) U.S. Cl. .................. 502/65; 502/64; 502/66; 502/67; 502/69; 502/71; 502/73; 502/74; 502/77; 502/78; 502/79
(58) Field of Search .................. 502/64, 65, 66, 502/67, 69, 71, 73, 74, 77, 78, 79, 325, 339, 304, 302, 303, 349

(56) References Cited

U.S. PATENT DOCUMENTS

| 4,335,023 A | | 6/1982 | Dettling et al. ............. 252/466 |
| 4,727,052 A | | 2/1988 | Wan et al. .................. 502/327 |
| 5,147,842 A | | 9/1992 | Funabiki et al. ............ 502/304 |
| 5,200,384 A | | 4/1993 | Funabiki et al. ............ 502/304 |
| 5,407,880 A | * | 4/1995 | Ikeda et al. |
| 5,714,228 A | | 2/1998 | Beckmeyer et al. ........ 428/118 |
| 5,772,972 A | | 6/1998 | Hepburn et al. ......... 423/213.5 |
| 5,958,828 A | * | 9/1999 | Murakami et al. |
| 6,047,544 A | | 4/2000 | Yamamoto et al. ........... 60/285 |
| 6,107,239 A | * | 8/2000 | Qin et al. |

FOREIGN PATENT DOCUMENTS

| EP | 0 592 713 | 4/1994 |
| EP | 0 857 511 | 8/1998 |
| EP | 0 904 827 | 3/1999 |
| EP | 0 992 276 | 4/2000 |
| JP | 2-56247 | 2/1990 |
| JP | 5-59942 | 3/1993 |
| JP | 6-74019 | 3/1994 |
| JP | 6-142457 | 5/1994 |
| JP | 7-102957 | 4/1995 |
| JP | 7-144119 | 6/1995 |
| JP | 11-104462 | 4/1999 |
| WO | 99/33549 | 7/1999 |

* cited by examiner

*Primary Examiner*—Steven Bos
*Assistant Examiner*—Christina Ildebrando
(74) *Attorney, Agent, or Firm*—Foley & Lardner

(57) ABSTRACT

An exhaust gas purifying catalyst is constructed by laminating sequentially a first layer containing alumina, a second layer containing hydrocarbon adsorbent, and a third layer containing catalytic components on a monolithic support in which a cell sectional shape is a polygon. The second layer has a ratio Lmax/Lmin of a thickest portion (Lmax) at cell corner portions to a thinnest portion (Lmin) at cell flat portions in a range of 1 to 10, and has a thickness of 10 to 500 μm. The catalyst can achieve the purification of HC, CO, and NOx with good balance, and improve the purification performance of cold HC by controlling a diffusion speed of the exhaust gases that pass through cells in a support and diffuse into a coating layer.

13 Claims, 6 Drawing Sheets

FIG. 4

TABLE 1

| | Support | 1st layer | | 2nd layer | | |
|---|---|---|---|---|---|---|
| | Number of cells /thickness (Nos. of cells/mils) | Alumina component amount (g/L) | Zeolite component amount (g/L) | Average thickness of a cell corner portion (μm) | Average thickness of a cell flat portion (μm) | Lmax./Lmin.(-) |
| EXAMPLE #1 | 600/4 | 100 | 150 | 85 | 20 | 4.3 |
| EXAMPLE #2 | 600/4 | 100 | 150 | 90 | 15 | 6.0 |
| EXAMPLE #3 | 600/4 | 100 | 150 | 80 | 30 | 2.7 |
| EXAMPLE #4 | 600/4 | 100 | 150 | 80 | 25 | 3.2 |
| EXAMPLE #5 | 600/4 | 100 | 150 | 80 | 25 | 3.2 |
| EXAMPLE #6 | 600/4 | 100 | 150 | 85 | 25 | 3.4 |
| EXAMPLE #7 | 600/4 | 100 | 150 | 85 | 25 | 3.4 |
| EXAMPLE #8 | 600/4 | 100 | 150 | 90 | 20 | 4.5 |
| EXAMPLE #9 | 600/4 | 100 | 150 | 90 | 25 | 3.6 |
| EXAMPLE #10 | 900/2 | 100 | 150 | 70 | 12 | 5.8 |
| EXAMPLE #11 | 600/4 | 150 | 100 | 55 | 20 | 2.8 |
| EXAMPLE #12 | 600/4 | 150 | 100 | 100 | 12 | 8.3 |
| EXAMPLE #13 | 600/4 | 50 | 250 | 130 | 20 | 6.5 |
| EXAMPLE #14 | 200/30 μm | 150 | 250 | 650 | 160 | 4.1 |
| EXAMPLE #15 | 200/10 | 100 | 250 | 300 | 280 | 1.1 |
| EXAMPLE #16 | 200/10 | 100 | 150 | 230 | 150 | 1.5 |
| EXAMPLE #17 | 300/6 | 100 | 150 | 200 | 120 | 1.7 |
| EXAMPLE #18 | 600/4 | 100 | 100 | 80 | 15 | 5.3 |
| EXAMPLE #19 | 600/4 | 100 | 150 | 85 | 22 | 3.9 |
| EXAMPLE #20 | 600/4 | 100 | 150 | 80 | 20 | 4.0 |
| EXAMPLE #21 | 300/3.5 | 100 | 150 | 70 | 50 | 1.4 |
| EXAMPLE #22 | 600/4 | 100 | 100 | 80 | 25 | 3.4 |
| EXAMPLE #23 | 600/4 | 100 | 100 | 80 | 20 | 4.0 |
| EXAMPLE #24 | 600/4 | 100 | 100 | 80 | 20 | 4.0 |
| EXAMPLE #25 | 600/4 | 100 | 100 | 80 | 20 | 4.0 |
| EXAMPLE #26 | 600/4 | 100 | 100 | 75 | 25 | 3.0 |
| EXAMPLE #27 | 600/4 | 100 | 100 | 75 | 20 | 3.8 |
| EXAMPLE #28 | 600/4 | 100 | 100 | 75 | 20 | 3.8 |
| COMPARATIVE EXAMPLE #1 | 600/4 | 0 | 150 | 110 | 10 | 11.0 |
| COMPARATIVE EXAMPLE #2 | 200/10 | 0 | 250 | 400 | 150 | 2.7 |
| COMPARATIVE EXAMPLE #3 | 200/30 μm | 0 | 250 | 770 | 40 | 19.3 |

FIG. 5

TABLE 2

| | 3rd layer | | | 4th layer | | |
|---|---|---|---|---|---|---|
| | Noble metal component amount (g/L) | Cerium oxide amount (g/L) | Alkaline earth metal amount (g/L) | Noble metal component amount (g/L) | | Zirconium oxide amount (g/L) |
| EXAMPLE #1 | Pd=3.77 | 14 | 5 | Pt=0.47 | Rh=1.41 | 10 |
| EXAMPLE #2 | Pd=3.77 | 14 | 5 | Pt=0.47 | Rh=1.41 | 10 |
| EXAMPLE #3 | Pd=3.77 | 14 | 5 | Pt=0.47 | Rh=1.41 | 10 |
| EXAMPLE #4 | Pd=3.77 | 14 | 5 | Pt=0.47 | Rh=1.41 | 10 |
| EXAMPLE #5 | Pd=3.77, Pt=0.47, Rh=1.41 | Cerium oxide amount=14, Zirconium oxide amount=10 | 5 | — | — | — |
| EXAMPLE #6 | Pd=3.77 | 14 | 5 | Pt=0.47 | Rh=1.41 | 10 |
| EXAMPLE #7 | Pd=3.77 | 14 | 5 | Pt=0.47 | Rh=1.41 | 10 |
| EXAMPLE #8 | Pd=3.77 | 14 | 5 | Pt=0.47 | Rh=1.41 | 10 |
| EXAMPLE #9 | Pd=3.77 | 14 | 5 | Pt=0.47 | Rh=1.41 | 10 |
| EXAMPLE #10 | Pd=3.77 | 14 | 5 | Pt=0.47 | Rh=1.41 | 10 |
| EXAMPLE #11 | Pd=3.77 | 14 | 5 | Pt=0.47 | Rh=1.41 | 10 |
| EXAMPLE #12 | Pd=3.77 | 14 | 5 | Pt=0.47 | Rh=1.41 | 10 |
| EXAMPLE #13 | Pd=3.77 | 14 | 5 | Pt=0.47 | Rh=1.41 | 10 |
| EXAMPLE #14 | Pd=3.77 | 14 | 5 | Pt=0.47 | Rh=1.41 | 10 |
| EXAMPLE #15 | Pd=3.77 | 14 | 5 | Pt=0.47 | Rh=1.41 | 10 |
| EXAMPLE #16 | Pd=3.77 | 14 | 5 | Pt=0.47 | Rh=1.41 | 10 |
| EXAMPLE #17 | Pd=3.77 | 14 | 5 | Pt=0.47 | Rh=1.41 | 10 |
| EXAMPLE #18 | Pd=3.77 | 14 | 5 | Pt=0.47 | Rh=1.41 | 10 |
| EXAMPLE #19 | Pd=3.77 | 14 | 5 | Pt=0.47 | Rh=1.41 | 10 |
| EXAMPLE #20 | Pd=3.77 | 14 | 5 | Pt=0.47 | Rh=1.41 | 10 |
| EXAMPLE #21 | Pd=3.77 | 14 | 5 | Pt=0.47 | Rh=1.41 | 10 |
| EXAMPLE #22 | Pt=0.47, Rh=1.41 | Zirconium oxide amount=10 | 5 | Pd=3.77 | | Cerium oxide amount=14 |
| EXAMPLE #23 | Pd=3.77 | 0 | 5 | Pt=0.47 | Rh=1.41 | 10 |
| EXAMPLE #24 | Pd=3.77 | 14 | 0 | Pt=0.47 | Rh=1.41 | 10 |
| EXAMPLE #25 | Pd=3.77 | 14 | 50 | Pt=0.47 | Rh=1.41 | 10 |
| EXAMPLE #26 | Pd=3.77 | 14 | 5 | Pt=0.47 | Rh=1.41 | 10 |
| EXAMPLE #27 | Pd=3.77 | 14 | 5 | Pt=0.47 | Rh=1.41 | 10 |
| EXAMPLE #28 | Pd=3.77 | 14 | 5 | Pt=0.47 | Rh=1.41 | 10 |
| COMPARATIVE EXAMPLE #1 | Pd=3.77 | 14 | 5 | — | — | — |
| COMPARATIVE EXAMPLE #2 | Pd=3.77 | 14 | 5 | Pt=0.47 | Rh=1.41 | 10 |
| COMPARATIVE EXAMPLE #3 | Pd=3.77 | 14 | 5 | Pt=0.47 | Rh=1.41 | 10 |

FIG. 6

TABLE 3

| | Cold HC adsorption rate at 'LA4 A bag' (%) | Desorbed cold HC purification rate at 'LA4 A bag' (%) | Convertion rate | | |
|---|---|---|---|---|---|
| | | | HC(%) | CO(%) | NOx(%) |
| EXAMPLE #1 | 77 | 35 | 96 | 95 | 92 |
| EXAMPLE #2 | 77 | 37 | 97 | 96 | 90 |
| EXAMPLE #3 | 78 | 36 | 95 | 96 | 92 |
| EXAMPLE #4 | 77 | 35 | 95 | 95 | 91 |
| EXAMPLE #5 | 78 | 35 | 96 | 97 | 90 |
| EXAMPLE #6 | 81 | 35 | 97 | 96 | 91 |
| EXAMPLE #7 | 82 | 36 | 97 | 97 | 92 |
| EXAMPLE #8 | 81 | 36 | 96 | 98 | 92 |
| EXAMPLE #9 | 82 | 36 | 95 | 98 | 91 |
| EXAMPLE #10 | 80 | 35 | 98 | 97 | 94 |
| EXAMPLE #11 | 78 | 35 | 96 | 98 | 92 |
| EXAMPLE #12 | 77 | 35 | 97 | 97 | 91 |
| EXAMPLE #13 | 76 | 36 | 98 | 98 | 91 |
| EXAMPLE #14 | 75 | 44 | 90 | 90 | 85 |
| EXAMPLE #15 | 75 | 45 | 91 | 90 | 87 |
| EXAMPLE #16 | 74 | 44 | 92 | 92 | 87 |
| EXAMPLE #17 | 76 | 42 | 94 | 93 | 88 |
| EXAMPLE #18 | 78 | 35 | 95 | 97 | 90 |
| EXAMPLE #19 | 77 | 35 | 96 | 95 | 91 |
| EXAMPLE #20 | 76 | 36 | 95 | 96 | 92 |
| EXAMPLE #21 | 78 | 44 | 94 | 93 | 88 |
| EXAMPLE #22 | 78 | 15 | 95 | 95 | 90 |
| EXAMPLE #23 | 77 | 10 | 85 | 88 | 80 |
| EXAMPLE #24 | 78 | 12 | 80 | 80 | 75 |
| EXAMPLE #25 | 65 | 5 | 96 | 95 | 91 |
| EXAMPLE #26 | 60 | 36 | 95 | 95 | 91 |
| EXAMPLE #27 | 68 | 35 | 95 | 96 | 90 |
| EXAMPLE #28 | 58 | 32 | 95 | 96 | 90 |
| COMPARATIVE EXAMPLE #1 | 78 | 15 | 95 | 96 | 90 |
| COMPARATIVE EXAMPLE #2 | 75 | 38 | 90 | 91 | 87 |
| COMPARATIVE EXAMPLE #3 | 75 | 22 | 90 | 90 | 85 |

EXHAUST GAS PURIFYING CATALYST

BACKGROUND OF THE INVENTION

1. Field of the Invention

The present invention relates to a catalyst for purifying exhaust gases from an internal combustion engine of an automobile and, more particularly, an exhaust gas purifying catalyst for removing effectively high concentration hydrocarbons exhausted in engine start-up.

2. Description of the Related Art

In the prior art, for the purpose of purifying the exhaust gases from the internal combustion engine of the automobile, etc., the three-way catalyst that can perform oxidation of carbon monoxide (CO) and hydrocarbons (HC) and reduction of nitrogen oxides (NOx) simultaneously has been widely employed.

A large amount of HC, which is called "cold HC", are exhausted at the low temperature in the engine start-up. However, since the exhaust gas temperature must be kept at more than 300° C. to make the above three-way catalyst active, the three-way catalyst is inactive at the low temperature immediately after the engine start-up. Therefore, if only the three-way catalyst in the prior art is employed, the cold HC is not purified but exhausted as it is.

In recent years, for the purpose of purifying this "cold HC", the HC adsorbing catalyst employing the zeolite has been developed.

The HC adsorbing catalyst is such a catalyst that adsorbs and holds temporarily the cold HC in the engine start-up during when the three-way catalyst is not activated, and then desorbs HC gradually to purify HC by using the three-way catalyst when the three-way catalyst is activated after the temperature of the exhaust gas is increased.

Such HC absorbing catalysts are disclosed in Japanese Laid-Open Patent publications Hei 6-74019 published in 1994, Hei 7-144119 published in 1995, Hei 6-142457 published in 1994, Hei 5-59942 published in 1993, Hei 7-102957 published in 1995, and Hei 11-104462 published in 1999.

In the exhaust gases, there are various HCs having different molecular weights. Since the HC adsorbing catalyst using the zeolite has a correlation between an HC distribution in the exhaust gases and a pore diameter in the zeolite, the zeolite having the optimum pore diameter must be employed.

In the prior art, the pore diameter distribution is adjusted by blending the MFI-type zeolite as the main element with the zeolite (e.g., USY type) having another pore diameter. However, since the distortion of the pore diameter and the adsorption/ desorption characteristic are different after long time use according to the zeolite type, adsorption of the HC in the exhaust gases becomes insufficient.

Also, in the prior art, a three-way catalyst contains noble metals such as platinum (Pt), palladium (Pd), rhodium (Rh), etc. mixed in the same layer and another three-way catalyst contains a Rh layer and a Pd layer coated separately, etc. have been proposed for the noble metals in the three-way catalyst. Japanese Laid-Open Patent Publication Hei 2-56247 published in 1990 discloses an exhaust gas purifying catalyst in which a second layer containing noble metals such as Pt, Pd, Rh, etc. as the main component and having the three-way catalytic function is provided on a first layer containing the zeolite as the main component.

SUMMARY OF THE INVENTION

In the exhaust gas purifying catalyst having the structure in which the zeolite layer as the HC adsorbent and the three-way catalyst layer are laminated on the monolithic support in the prior art, following problems are pointed out.

In the low temperature zone of the exhaust gases immediately after the engine start-up, such three-way catalyst layer prevents the cold HC diffusing into the zeolite layer and thus makes worse the adsorption efficiency of the cold HC.

In addition, since a thickness of the zeolite layer coated in the cells of the monolithic support is not uniform, HC adsorbed in the zeolite is quickly desorbed at the thin portion of the zeolite layer with the increase of the exhaust gas temperature and the increase of the exhaust gas flow rate. If desorption of HC is too quick, HC cannot be effectively purified in the overlying three-way catalyst layer.

Further, in order to make the three-way catalyst effectively fulfill its purifying function, the air-fuel ratio (A/F) must be set in the vicinity of a stoichometric air-fuel ratio (A/F=14.6) at which the oxidation of HC and CO and the reduction of NOx are balanced. However, in the exhaust gas purifying catalyst in which the three-way catalyst layer is laminated on the zeolite layer, since HC which has been adsorbed into the zeolite layer in the low temperature zone of the exhaust gases immediately after the start of the internal combustion engine is abruptly desorbed with the increase of the exhaust gas temperature, the exhaust gas becomes fuel-rich. Therefore, the three-way catalyst does not fulfill sufficiently the purification function, the purification of HC, Co, NOx is not performed with good balance.

In the prior art, no particular study of a structure of the zeolite layer coated in the cell of the monolithic support has been made. However, according to the study made by the inventor of the present invention, it is found that, unless the optimization of the zeolite layer structure can be attained in the HC adsorbing catalyst, the HC adsortion/desorption/ purification cycle cannot be effectively carried out.

Moreover, according to the study of the inventors of the present invention, when the zeolite layer is coated in the monolithic support having polygonal cells, the inner wall of the coating layer is formed substantially like an inscribed circle of the polygonal cell. In other words, a thickness of the coating layer is thick at the cell corner portion while a thickness of the coating layer is thin at the cell side portion. Therefore, there is such a tendency that the adsorption/ desorption characteristic of the zeolite in the cell side portion is considerably degraded rather than that in the cell corner portion.

In order to achieve the uniformization of the thickness of the zeolite layer, it may be considered that the monolithic supports having the cells whose inner wall sectional shape is a circle is employed. In this case, a thickness of the wall portion corresponding to the cell corner portion is increased and thus a volume of the support itself is increased. As a result, since a heat capacity of the support is increased and then the temperature increase of the three-way catalyst is delayed, the purification efficiency of HC desorbed from the zeolite layer is considerably degraded.

Besides, in the three-way catalyst for purifying HC desorbed from the HC adsorbent, a large quantity of noble metal are employed to maintain the high purification performance from the beginning to the endurance time, or an air is introduced from the outside to achieve the quick activation. Therefore, the catalyst that enables the high performance by the reduced amount of the noble metal is desired. However, if the amount of the noble metal is reduced, the durability of the catalyst becomes insufficient and thus the catalytic activity and the purification performance are deteriorated in the low temperature zone after the endurance time.

In view of the above subjects in the prior art, it is an object of the present invention to provide an exhaust gas purifying catalyst capable of achieving purification of HC, CO, and NOx with good balance and improving the purification performance of cold HC by controlling the diffusion (speed) of the exhaust gases that pass through cells in a support and diffuse into coating layers.

In order to achieve the above object, according to an aspect of an exhaust gas purifying catalyst of this present invention, such exhaust gas purifying catalyst comprises a monolithic support having a plurality of cells each of which has a polygonal sectional shape, a first layer formed on a monolithic support to contain heat resisting inorganic material, a second layer formed on the first layer to contain hydrocarbon adsorbent, and a third layer formed on the second layer to contain a metal-based catalyst. Where the second layer has a ratio Lmax/Lmin of the thickest portion (Lmax) at corner portions of the cells to the thinnest portion (Lmin) at flat portions of the cells in a range of 1 to 10, and the second layer has a thickness of 10 to 500 μm.

As the heat resisting inorganic material, ceramic materials such as alumina, titania, zirconia, etc. may be listed.

According to the above aspect of this present invention, the second layer containing hydrocarbon adsorbent as the main component (called the hydrocarbon adsorbent layer hereinafter) is not directly formed on the monolithic support but formed on the first layer containing the heat resisting inorganic material as the main component. The first layer thickly covers the cell corner portions of the support, and brings inner walls of the cells close to the circular shape. Therefore, the thickness of the hydrocarbon adsorbent layer can be adjusted into the appropriate range.

Accordingly, HC adsorption/desorption/purification cycles are carried out effectively, and such HC adsorption/desorption/purification can be performed uniformly over the entire second layer without deviation.

Also, a catalytic component layer containing Pd may be employed as the third layer and then an insoluble salt of an alkaline earth metal may be contained in this layer. Sintering of the noble metal can be suppressed and thus the low temperature activity and the purification performance can be improved.

In addition, if a layer containing rhodium is laminated as a fourth layer on the third layer, the cold HC adsorbing/desorbing ability characteristic and the desorbed HC purification performance can be effectively exhibited.

Furthermore, platinum (Pt) may be mixed in the third layer and the fourth layer. Therefore, the poisoning resistance of the third layer as the catalytic component layer (three-way catalyst layer) can be improved.

BRIEF DESCRIPTION OF THE DRAWINGS

FIG. 4 is Table 1 showing compositions and structures of first layers and second layers of the exhaust gas purifying catalysts that are prepared in respective examples in the present invention;

FIG. 5 is Table 2 showing compositions and structures of third layers and fourth layers of the exhaust gas purifying catalysts that are prepared in respective examples in the present invention; and FIG. 6 is Table 3 showing adsorption rate, purification rate, and addition rate of cold HC by the exhaust gas purifying catalysts that are prepared in respective examples in the present invention.

DESCRIPTION OF THE PREFERRED EMBODIMENTS

Figure 1A:
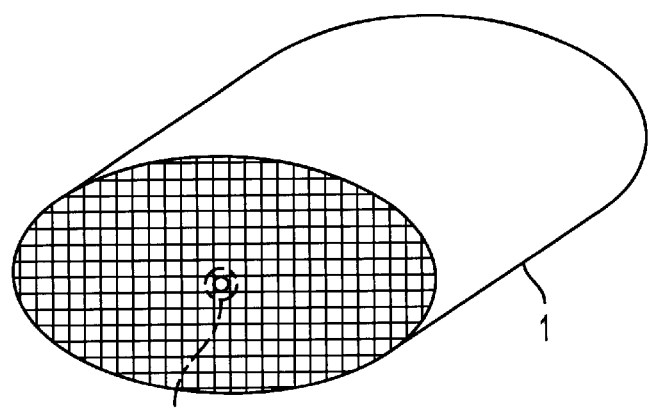
FIG. 1 is a sectional view showing a configuration of an exhaust gas purifying catalyst according to an embodiment of the present invention.
Figure 1B:
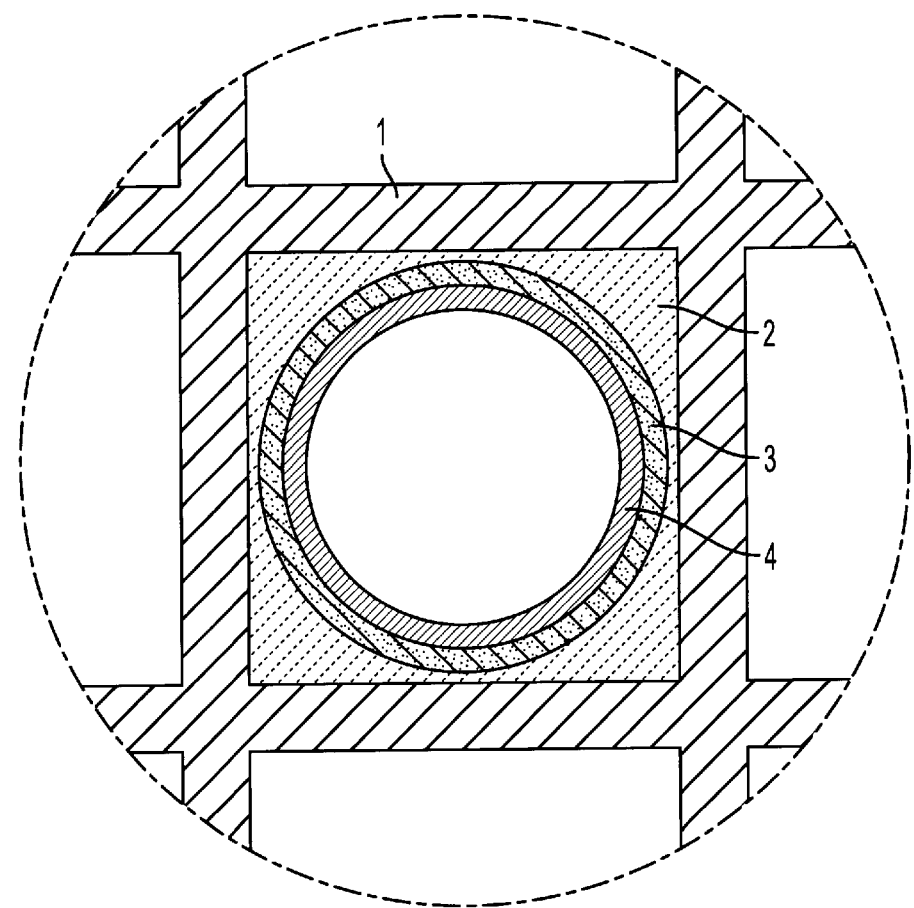

Exhaust gas purifying catalysts according to embodiments of the present invention will be explained in detail hereinafter FIG. 1 shows a configuration of an exhaust gas purifying catalyst according to the present embodiment. An outer perspective view of the exhaust gas purifying catalyst is illustrated on the upper side of FIG. 1, and an enlarged sectional view of a part of the exhaust gas purifying catalyst corresponding to a single cell is illustrated on the lower side of FIG. 1.

As shown in FIG. 1, in the exhaust gas purifying catalyst according to the present embodiment, a first layer 2 containing heat resisting inorganic material, a second layer 3 containing hydrocarbon adsorbing material, and a third layer 4 containing the metal catalyst are laminated sequentially on a monolithic support 1 that has a plurality of cells whose sectional shape is a polygon. The exhaust gases flow through the center area of the cell on the inside of the third layer 4.

Figure 2A:
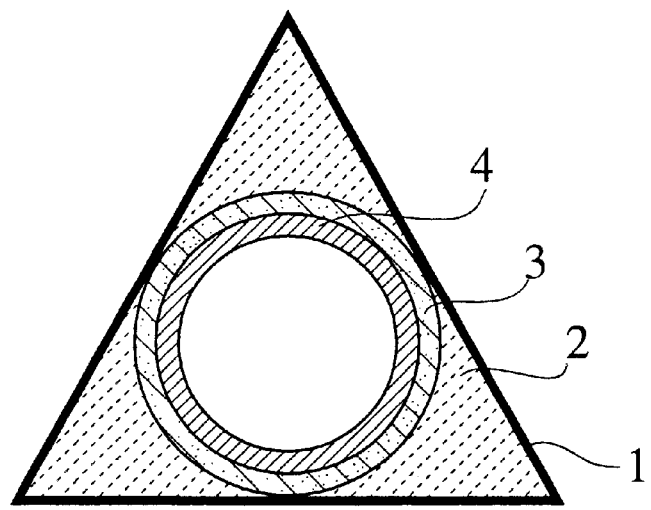
FIGS. 2A and 2B are a partial sectional views showing the cell having a regular triangle shape and a regular hexagonal shape respectively.
Figure 2B:
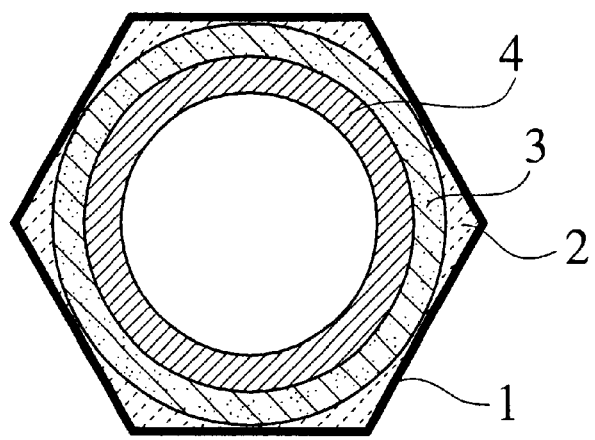

For example, a sectional shape of the cell may be regular quadrangle, regular triangle or regular hexagonal as shown in FIGS. 1, 2A and 2B. Also the shape of the cell may be slightly deformed .

The first layer 2 containing heat resisting inorganic material covers thickly respective corner portions of the cell of the monolithic support 1 to form the inner wall sectional shape of the cell substantially into a circular shape. Therefore, in the exhaust gas purifying catalyst according to the present embodiment, difference in the film thickness of the hydrocarbon adsorbent layer (referred to as an "HC adsorbent layer" hereinafter) as the second layer 3 laminated on the first layer 2 can be reduced between the cell corner portion 5 and the cell side (flat) portion and thus the uniform layer can be easily formed on the overall inner wall of the cell.

Also, in the exhaust gas purifying catalyst according to the present embodiment, the HC adsorbent layer 3 is adjusted such that a ratio Lmax/Lmin of the thickest portion (Lmax) at the cell corner portion 5 to the thinnest portion (Lmin) at the cell flat portion satisfies Lmax/Lmin=1 to 10 and the HC adsorbent layer 3 has the thickness of 10 μm to 500 μm.

If the ratio Lmax/Lmin of the thickest portion to the thinnest portion exceeds 10, desorption of HC at the thinnest portion becomes too quick and therefore the purification efficiency of HC being desorbed from the HC adsorbent layer 3 is degraded. Also, if the thickness of the HC adsorbent layer 3 is less than 10 μm, the HC adsorbing ability and the desorption suppressing effect cannot be sufficiently obtained. In contrast, if the thickness of the HC adsorbent layer 3 exceeds 500 μm, the HC adsorbing ability and the desorption suppressing effect are saturated. Therefore, improvement of the cold HC adsorption efficiency and the HC desorption suppression can be attained by setting the thickness of the HC adsorbent layer 3 within the above range.

Also, the heat resisting inorganic material interposed between the monolithic support 1 and the HC adsorbent layer (second layer) 3 can improve adhesiveness of the HC adsorbent layer 3, and also has an effect of preventing the peeling of the HC adsorbent layer 3 from the monolithic support 1.

The third layer 4 formed on the HC adsorbent layer 3 to contain the metal catalyst (referred to as a "metal-based catalyst layer" hereinafter) can purify effectively HC desorbed from the HC adsorbent layer 3. If Pd that is excellent in the activating operation for the HC oxidation reaction is used as the metal catalyst, the purification of HC, CO, and NOx can be performed with good balance even when the inside of the metal-based catalyst layer 4 becomes fuel-rich atmosphere.

Since the HC adsorbent layer 3 is formed under the metal-based catalyst layer 4, such HC adsorbent layer 3 does not directly come into contact with the exhaust gases passing through the cell. Therefore, the increase of the temperature of the HC adsorbent layer 3 is delayed in contrast to the metal-based catalyst layer 4, so that the HC adsorbent layer holds the adsorbed HC longer. On the contrary, since the metal-based catalyst layer 4 directly comes into contact with the exhaust gases passing through the cell to increase its temperature quickly, the three-way catalyst is quickly activated. As a result, balance of HC adsorption/desorption/purification becomes good.

Next, components of the first layer to the fourth layer will be explained hereunder.

As the heat resisting inorganic material used in the first layer 2, for example, various ceramic materials such as alumina ($Al_2O_3$), titania ($TiO_2$), zirconia ($ZrO_2$), etc. may be listed. For example, if the alumina is used, it is preferable that the alumina having a large specific surface area and a large bulk should be employed, although not particularly limited. In particular, the alumina such as γ-alumina is desired.

Also, as the HC adsorbent layer used in the second layer 3, various zeolites may be listed. If the H-type β-zeolite whose Si/2Al ratio is at least 10 to 1500 is used as the main component of the zeolite, the wide adsorbing ability for various HCs having different molecular diameters in the exhaust gases can be exhibited, and also destruction of the zeolite structure under the high temperature and the moisture existing atmosphere can be suppressed. Therefore, the HC adsorbent layer can get the high adsorbing ability from the beginning to the endurance time.

If the Si/2Al ratio of the H-type β-zeolite is less than 10, the heat resistance is low and in some times the sufficient adsorbing ability cannot be attained after the endurance time. In contrast, if the Si/2Al ratio exceeds 1500, the heat resistance improving effect cannot be achieved and inversely desorption of HC from the H-type β-zeolite is accelerated considerably. In some cases, the postprocessing effect of the desorbed HC becomes worse.

Also, in the present embodiment, it is preferable that any one of MFI-type zeolite, Y-type zeolite, USY-type zeolite, and mordenite or two more of them in addition to the H-type β-zeolite should be employed as the zeolite type. Accordingly, the HC adsorbent layer can exhibit the wider adsorbing ability for various HCs having different molecular diameters in the exhaust gases.

In this case, it is preferable that an amount of the MFI-type zeolite, etc. added to the H-type β-zeolite should be set to 10 weight % to 50 weight % of the total zeolite amount.

If such amount is less than 10 weight %, the adding effect of the MFI-type zeolite, etc. does not appear whereas, if such amount exceeds 50 weight %, sometimes the total adsorption amount is lowered.

In addition, any one of palladium (Pd), magnesium (Mg), calcium (Ca), strontium (Sr), barium (Ba), silver (Ag), yttrium (Y), lanthanum (La), cerium (Ce), neodymium (Nd), phosphorus (P), boron (B), and zirconium (Zr), or two or more of them may be contained in the zeolite type of the above second layer. Accordingly, since the HC holding force of the zeolite can be improved, desorption of a variety of HCs having different molecular diameters in the exhaust gases can be delayed. Also, the heat resistance and the structural stability can be improved.

It is preferable that a contained amount of such Pd. Mg, Ca, etc. should be set to 0.1 weight % to 10 weight %. If such contained amount is less than 0.1 weight %, suppressing desorption effect of the added elements for cannot be sufficiently exhibited whereas, if such contained amount exceeds 10 weight %, the adsorbing ability becomes worse because the pores of the zeolite are blocked.

Furthermore, in the exhaust gas purifying catalyst according to the present embodiment, the zirconium oxide that contains any one or two or more of Ce, Nd, and La and Rh by 1 to 40 mol % in terms of metal may be contained in the HC adsorbent layer 3 containing the H-type β-zeolite as the main component. Therefore, the purification efficiency of HC desorbed from the zeolite can be improved.

In this case, it is preferable that an amount of Rh contained in the HC adsorbent layer 3 should be set to 0.001 g/L to 1 g/L. An action for improving the desorbed HC purification efficiency by Rh cannot be enoughly attained if such amount is less than 0.001 g/L, but such action for improving the desorbed HC purification efficiency by Rh is saturated if the amount is in excess of 1 g/L.

Also, it is preferable that the contained amount of the zirconium oxide in the HC adsorbent layer 3 should be set to 1 g/L to 50 g/L. The degradation suppressing action of Rh by adding the zirconium oxide cannot be satisfactorily obtained if such contained amount is less than, whereas the adding effect is saturated if contained amount is in excess of 50 g/L.

Then, Pd, Pt, Rh, or the like may be thought of as the catalytic component used in the metal-based catalyst layer 4. Various elements having the so-called three-way catalytic function may be employed. Especially, Pd is preferable, for Pd is excellent in the activating action of the HC oxidation reaction and thus Pd can perform the purification of HC, CO, and NOx with good balance even when the inside of the metal-based catalyst layer 4 becomes fuel-rich atmosphere.

If Pd is selected as such noble metal, it is preferable that the insoluble alkaline earth metal salt, e.g., insoluble barium salt should be added. The added alkaline earth metal, etc. suppresses the sintering of Pd and sustains the purification characteristic. Also the added alkaline earth metal, etc. alleviate HC poisoning Pd. Preferably the contained amount of the alkaline earth metal should be set to 1 g/L to 30 g/L in terms of oxide. If the oxide amount of the alkaline earth metal element is less than 1 g/L, the alleviating HC poisoning effect is small and thus the low temperature activation improving effect cannot be sufficiently achieved. In contrast, if the oxide amount of the alkaline earth metal element exceeds 30 g/L, the HC adsorbing ability of Pd is remarkably reduced and inversely the low temperature activity is degraded.

Further, in the exhaust gas purifying catalyst according to the present embodiment, the fourth layer containing Rh may be laminated on the third layer. Thus, the poisoning Pd in the third layer due to P, Pb (lead), etc. in the exhaust gases can be suppressed.

Furthermore, it is possible to mix Pt into the third layer and the fourth layer. Thus, the poisoning resistance of the metal-based catalyst layer 4 having the three-way catalytic function can be improved.

In this case, the exhaust gas purifying catalyst of the present embodiment may have such a structure that Pd having an excellent HC oxidation activity is used as the catalytic component of the metal-based catalyst layer (third layer) 4 and then either Rh is also contained in the same layer or an Rh layer is provided thereon as the fourth layer. According to such structure, even if the inside of the metal-based catalyst layer (third layer) 4 becomes the fuel-rich atmosphere by the desorbed HC, the purification of HC, CO, and NOx can be carried out with good balance. Also, since Pd that is easily affected by the poisoning of P, Pb, etc. is contained together with Rh and also Pd is arranged on the inside of Rh, the influence of the poisoning can be reduced.

As described above, the above noble metal is contained in the metal-based catalyst layer (third layer) 4 but materials other than these noble metals may be added. For example, the alumina containing any one of Ce, Zr, and La or two or more of them by 1 to 10 mol % in terms of metal and the cerium oxide containing any one of Zr, Nd, and La or two or more of them by 1 to 40 mol % in terms of metal may be contained. In such case, degradation of Pd in the oxygen deficient atmosphere can be suppressed.

In this case, it is preferable that an amount of the cerium oxide contained in the metal-based catalyst layer (third layer) 4 should be set to 1 g/L to 200 g/L. The Pd degradation suppressing effect obtained by adding the cerium oxide cannot be satisfactorily attained if such amount is less than 1 g/L, whereas the adding effect is saturated if such amount is in excess of 200 g/L.

Also, if the zirconium oxide that contains any one or two or more of Ce, Zr, and La or two or more of them by 1 to 40 mol % in terms of metal is contained other than the above cerium oxide, degradation of Pd in the oxygen deficient atmosphere can be suppressed.

In this case, it is preferable that an amount of the zirconium oxide contained in the third layer should be set to 1 g/L to 200 g/L. The Rh degradation suppressing effect obtained by adding the zirconium oxide cannot be satisfactorily attained if such amount is less than 1 g/L, whereas the adding effect is saturated if such amount is in excess of 200 g/L.

As the monolithic support employed in the exhaust gas purifying catalyst, ceramic or metal monolithic support can be considered. In this case, preferably the cell sectional shape of this support should be formed as a polygon such as a triangle, a quadrilateral, a hexagon, an octagon, etc., and more preferably the cell sectional shape should be formed as a regular polygon.

The HC adsorbent layer (second layer) 3 and the metal-based catalyst layer (third layer) 4 are impregnated in the support whose cell number is 100 to 1000 1/L. Desorption of HC from the zeolite layer can be delayed. As the exhaust gases contact the three-way catalytic component layer sufficiently, the exhaust gases are purified well.

Examples of the exhaust gas purifying catalyst according to the present embodiment will be explained hereinafter.

EXAMPLE #1

The slurry solution is prepared by introducing γ-alumina of 400 g, nitric acid alumina sol (sol obtained by adding 10 weight % nitric acid into 10 weight % boehmite alumina) of 1000 g, and a pure water of 500 g into a magnetic ball mill, and then crushing the mixture. This slurry solution is coated on the cordierite monolithic support (1.3 L) whose cell density is 600 cells/4 mil. The excessive slurry in the cells is removed by an air flow, then dried, and then burned at 400° C. for one hour. An alumina layer A acting as the first layer is obtained by repeating the coating operation after the burning until the coated amount of the slurry comes up to 100 g/L.

The slurry solution is prepared by introducing β-zeolite powder (H-type, Si/2Al=50) of 400 g, silica sol (20% solid content) of 500 g, and a pure water of 1000 g into a magnetic ball mill, and then crushing the mixture. This slurry solution is coated on the alumina layer 1A. The excessive slurry in the cells is removed by an air flow, then dried, and then burned at 400° C. for one hour. A catalyst layer B acting as the HC adsorbent layer of the second layer is obtained by repeating the coating operation until the coated amount of the slurry after the burning comes up to 150 g/L.

The Pd-impregnated alumina powder (powder I) is prepared by impregnating the alumina powder containing 3 mol % Ce with a palladium nitrate aqueous solution, then drying the resultant at 150° for twenty four hours, and then burning the resultant at 400° C. for one hour and then at 600° C. for one hour. A Pd concentration in this powder I is 8.0 weight %. In this case, lanthanum, zirconium, neodymium, etc. may be contained into the powder I.

The Pd-impregnated cerium oxide powder (powder II) is prepared by impregnating the cerium oxide powder containing 1 mol % La and 32 mol % Zr with the palladium dinitrodiamine aqueous solution, then drying the resultant at 150° C. for twenty four hours, and then burning the resultant at 400° for one hour and then at 600° C. for one hour. A Pd concentration in this powder II is 4.0 weight %. Lanthanum, neodymium, etc. may be contained into the cerium oxide powder.

Then, the slurry solution is prepared by introducing the Pd-impregnated alumina powder (powder I) of 400 g, the Pd-impregnated cerium oxide powder (powder II) of 141 g, the barium carbonate powder of 64 g, the nitric acid alumina sol of 8.5 g (sol obtained by adding 10 weight % nitric acid into 10 weight % boehmite alumina), and the pure water of 1000 g into a magnetic ball mill, and then crushing the mixture. Then, this slurry solution is coated on the catalyst layer B. Then, the excessive slurry in the cells is removed by the air flow, and then the slurry is dried and then burned at 400° C. for one hour. Thus, a catalyst layer C acting as the metal-based catalyst layer of the third layer is formed repeating the coating operation until the coated amount of the slurry after the burning comes up to 60 g/L.

The Rh-impregnated alumina powder (powder III) is prepared by impregnating the alumina powder containing 3 weight % Zr with the rhodium nitrate aqueous solution, then drying the resultant at 150° C. for twenty four hours, and then burning the resultant at 400° C. for one hour and then at 600° C. for one hour. A Rh concentration in this powder III is 5.0 weight %.

The Pt-impregnated alumina powder (powder IV) is prepared by impregnating the alumina powder containing 3 weight % Ce with the platinum dinitrodiamine aqueous solution, then drying the resultant at 150° C. for twenty four hours, and then burning the resultant at 400° C. for one hour and then at 600° C. for one hour. A Pt concentration in this powder IV is 5.0 weight %.

Then, the slurry solution is prepared by introducing the Rh-impregnated alumina powder (powder III) of 283 g, Pt-impregnated alumina powder (powder IV) of 94 g, the zirconium oxide powder of 100 g containing 1 mol % La and 20 mol % Ce, and the nitric acid alumina sol of 23 g into the magnetic ball mill, and then crushing the mixture. Then, this slurry solution is coated on the above catalyst layer C. Then, the excessive slurry in the cells is removed by the air flow, and then the slurry is dried and then burned at 400° C. for one hour. Thus, a catalyst layer D acting as the rhodium containing layer of the fourth layer is formed repeating the coating operation until a weight of the coated layer after the burning comes up to 50 g/L (total coated amount is 360 g/L).

An average of the maximum thicknesses Lmax at the cell corner portions of the HC adsorbent layer (second layer) in EXAMPLE #1 is 85 μm, and an average of the minimum thicknesses Lmin at the cell flat portions is 20 μm. The ratio Lmax/Lmin is 4.3.

EXAMPLE #2

The β-zeolite powder (H type, Si/2Al=300) is used as the zeolite added to the slurry for the HC adsorbent layer. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #2 is 90 μm, and an average of the minimum thicknesses Lmin at the cell flat portions is 15 μm. The ratio Lmax/Lmin is 6.0.

EXAMPLE #3

The β-zeolite powder (H type, Si/2Al=1000) is used as the zeolite added to the slurry for the HC adsorbent layer. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #3 is 80 μm, and an average of the minimum thicknesses Lmin at the cell flat portions is 30 μm. The ratio Lmax/Lmin is 2.7.

EXAMPLE #4

The β-zeolite powder (H type, Si/2Al=25) is used as the zeolite added to the slurry for the HC adsorbent layer. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #4 is 80 μm, and an average of the minimum thicknesses Lmin at the cell flat portions is 25 μm. The ratio Lmax/Lmin is 3.2.

EXAMPLE #5

The β-zeolite powder (H type, Si/2Al=75) is used as the zeolite added to the slurry for the HC adsorbent layer. In manufacturing the metal-based catalyst layer (third layer), the slurry prepared by mixing all the powder I, the powder II, the powder III, the powder IV, the barium carbonate, and the nitrid acid alumina sol is used. That is, components of the fourth layer are mixed into the third layer. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #5 is 80 μm, and an average of the minimum thicknesses Lmin at the cell flat portions is 25 μm. The ratio Lmax/Lmin is 3.2.

EXAMPLE #6

As the zeolite added to the slurry for the HC adsorbent layer, the β-zeolite powder (H type, Si/2Al=75) of 300 g, the MFI powder (H type, Si/2Al=200) of 25 g, and mordenite powder (H type, Si/2Al=80) of 25 g are used. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #6 is 85 μm, and an average of the minimum thicknesses Lmin at the cell flat portions is 25 μm. The ratio Lmax/Lmin is 3.4.

EXAMPLE #7

As the zeolite added to the slurry for the HC adsorbent layer, the β-zeolite powder (H type, Si/2Al=300) of 200 g, the MFI powder of 50 g, the Y-type zeolite powder (H type, Si/2Al=30) of 50 g, the USY-type zeolite powder (H type, Si/2Al=80) of 50 g, and mordenite powder of 50 g are used. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #7 is 85 μm, and an average of the minimum thicknesses Lmin at the cell flat portions is 25 μm. The ratio Lmax/Lmin is 3.4.

EXAMPLE #8

As the zeolite added to the slurry for the HC adsorbent layer, the powder of 350 g obtained by impregnating the β-zeolite powder (H type, Si/2Al=75) with 1 weight % Ag and 0.5 weight % P and the powder of 50 g obtained by impregnating the MFI powder with 0.5 weight % Pd are used. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #8 is 90 μm, and an average of the minimum thicknesses Lmin at the cell flat portions is 20 μm. The ratio Lmax/Lmin is 4.5.

EXAMPLE #9

As the zeolite added to the slurry for the HC adsorbent layer, the β-zeolite powder (H type, Si/2Al=75) of 340 g, the powder of 10 g obtained by impregnating the β-zeolite powder (H type, Si/2Al=75) with 1 weight % Ag and 0.5 weight % P, the powder of 10 g obtained by impregnating the β-zeolite powder (H type, Si/2Al=75) with 0.01 weight % Mg, 0.01 weight % Ce, and 0.01 weight % Zr, the powder of 10 g obtained by impregnating the MFI powder with 0.01 weight % Ca, 0.01 weight % Y, and 0.01 weight % B, the powder of 10 g obtained by impregnating the mordenite powder with 0.2 weight % Pd, the powder of 10 g obtained by impregnating the Y-zeolite powder with 0.01 weight % Sr and 0.01 weight % La, and the powder of 10 g obtained by impregnating the USY-zeolite powder with 0.01 weight % Ba and 0.01 weight % Nd are used. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #9 is 90 μm, and an average of the minimum thicknesses Lmin at the cell flat portions is 25 μm. The ratio Lmax/Lmin is 3.6.

EXAMPLE #10

The exhaust gas purifying catalyst is prepared under the same conditions as EXAMPLE #1 except for the employment of the support whose cell density is 900 cells/2 mil as the monolithic support.

An average of the maximum thicknesses Lmax at the cell corner portions of the HC adsorbent layer (second layer) in EXAMPLE #10 is 70 μm, and an average of the minimum thicknesses Lmin at the cell flat portions is 12 μm. The ratio Lmax/Lmin is 5.8.

EXAMPLE #11

The coated amount of the alumina layer as the first layer is set to 150 g/L, and the coated amount of the β-zeolite component layer in the HC adsorbent layer as the second layer is set to 100 g/L. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #11 is 55 μm, and an average of the minimum thicknesses Lmin at the cell flat portions is 20 μm. The ratio Lmax/Lmin is 2.8.

EXAMPLE #12

The coated amount of the alumina layer as the first layer is set to 50 g/L, and the coated amount of the β-zeolite component layer in the HC adsorbent layer as the second layer is set to 150 g/L. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #12 is 100 μm, and an average of the minimum thicknesses Lmin at the cell flat portions is 12 μm. The ratio Lmax/Lmin is 8.3.

EXAMPLE #13

The coated amount of the alumina layer as the first layer is set to 50 g/L, and the coated amount of the β-zeolite component layer in the HC adsorbent layer as the second layer is set to 250 g/L. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #13 is 130 μm, and an average of the minimum thicknesses Lmin at the cell flat portions is 20 μm. The ratio Lmax/Lmin is 6.5.

EXAMPLE #14

The metal support whose cell sectional shape is a triangle and whose cell density is 200 cells/30 μm is used as the monolithic support. The coated amount of the alumina layer as the first layer is set to 150 g/L, and the coated amount of the β-zeolite component layer in the HC adsorbent layer as the second layer is set to 150 g/L. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #14 is 650 μm, and an average of the minimum thicknesses Lmin at the cell flat portions is 160 μm. The ratio Lmax/Lmin is 4.1.

EXAMPLE #15

The support whose cell density is 200 cells/10 mil is used as the monolithic support. The coated amount of the alumina layer as the first layer is set to 100 g/L, and the coated amount of the β-zeolite component layer in the HC adsorbent layer as the second layer is set to 250 g/L. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #15 is 300 μm, and an average of the minimum thicknesses Lmin at the cell flat portions is 280 μm. The ratio Lmax/Lmin is 1.1.

EXAMPLE #16

The support whose cell density is 200 cells/10 mil is used as the monolithic support. The coated amount of the alumina layer as the first layer is set to 100 g/L, and the coated amount of the β-zeolite component layer in the HC adsorbent layer as the second layer is set to 150 g/L. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #16 is 230 μm, and an average of the minimum thicknesses Lmin at the cell flat portions is 150 μm. The ratio Lmax/Lmin is 1.5.

EXAMPLE #17

The support whose cell density is 300 cells/6 mil is used as the monolithic support. The coated amount of the alumina layer as the first layer is set to 100 g/L, and the coated amount of the β-zeolite component layer in the HC adsorbent layer as the second layer is set to 150 g/L. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #17 is 200 μm, and an average of the minimum thicknesses Lmin at the cell flat portions is 120 μm. The ratio Lmax/Lmin is 1.7.

EXAMPLE #18

In forming the metal-based catalyst layer as the third layer, the barium acetate aqueous solution is used in place of the barium carbonate. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #18 is 80 μm, and an average of the minimum thicknesses Lmin at the cell flat portions is 15 μm. The ratio Lmax/Lmin is 5.3.

EXAMPLE #19

As the first layer, a titania layer is formed on the monolithic support, in place of the alumina layer. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #19 is 85 μm, and an average of the minimum thicknesses Lmin at the cell flat portions is 22 μm. The ratio Lmax/Lmin is 3.9.

EXAMPLE #20

As the first layer, a zirconia layer is formed on the monolithic support, in place of the alumina layer. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #20 is 80 µm, and an average of the minimum thicknesses Lmin at the cell flat portions is 20 µm. The ratio Lmax/Lmin is 4.0.

EXAMPLE #21

The cordierite monolithic support whose cell sectional shape is an almost regular hexagon is used as the support for the exhaust gas purifying catalyst. The cell density of this support is 300 cells/3.5 mil. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #21 is 70 µm, and an average of the minimum thicknesses Lmin at the cell flat portions is 50 µm. The ratio Lmax/Lmin is 1.4.

EXAMPLE #22

In the exhaust gas purifying catalyst prepared in EXAMPLE #1, the components in the third layer are exchanged with those in the fourth layer. That is, the third layer is formed of the layer containing Rh as the main component and the fourth layer is formed of the layer containing Pd as the main component. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #22 is 80 µm, and an average of the minimum thicknesses Lmin at the cell flat portions is 25 µm. The ratio Lmax/Lmin is 3.4.

EXAMPLE #23

The cerium oxide is not contained in the third layer, and the zirconium oxide is not contained in the fourth layer. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #23 is 80 µm, and an average of the minimum thicknesses Lmin at the cell flat portions is 20 µm. The ratio Lmax/Lmin is 4.0.

EXAMPLE #24

The barium carbonate is not contained in the third layer. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #24 is 80 µm, and an average of the minimum thicknesses Lmin at the cell flat portions is 20 µm. The ratio Lmax/Lmin is 4.0.

EXAMPLE #25

The barium carbonate of 643 g is added into the slurry used to manufacture the third layer. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #25 is 80 µm, and an average of the minimum thicknesses Lmin at the cell flat portions is 20 µm. The ratio Lmax/Lmin is 4.0.

EXAMPLE #26

As the zeolite added into the slurry solution for the HC adsorbent layer, the β-zeolite of 50 g and the MFI of 350 g are used. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #26 is 75 µm, and an average of the minimum thicknesses Lmin at the cell flat portions is 25 µm. The ratio Lmax/Lmin is 3.0.

EXAMPLE #27

As the zeolite added into the slurry solution for the HC adsorbent layer, the Y-type zeolite of 400 g is used. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #27 is 75 µm, and an average of the minimum thicknesses Lmin at the cell flat portions is 20 µm. The ratio Lmax/Lmin is 3.8.

EXAMPLE #28

As the zeolite added into the slurry solution for the HC adsorbent layer, the β-zeolite being impregnated with 30 weight % Ag and 5 weight % P is used instead of the β-zeolite. The exhaust gas purifying catalyst is prepared under the same conditions as EXAMPLE #1 except for the above.

An average of the maximum thicknesses Lmax at the cell corner portions of the HC adsorbent layer (second layer) in EXAMPLE #28 is 75 µm, and an average of the minimum thicknesses Lmin at the cell flat portions is 20 µm. The ratio Lmax/Lmin is 3.8.

COMPARATIVE EXAMPLE #1

The alumina component layer as the first layer is not formed, and the HC adsorbent layer is coated directly on the monolithic support. The exhaust gas purifying catalyst is prepared under the same conditions as EXAMPLE #1 except for the above.

An average of the maximum thicknesses Lmax at the cell corner portions of the HC adsorbent layer (second layer) in COMPARATIVE EXAMPLE #1 is 110 µm, and an average of the minimum thicknesses Lmin at the cell flat portions is 10 µm. The ratio Lmax/Lmin is 11.0.

COMPARATIVE EXAMPLE #2

The alumina component layer as the first layer is not formed, and the HC adsorbent layer is coated directly on the monolithic support. The exhaust gas purifying catalyst is prepared under the same conditions as EXAMPLE #15 except for the above.

An average of the maximum thicknesses Lmax at the cell corner portions of the HC adsorbent layer (second layer) in COMPARATIVE EXAMPLE #2 is 400 µm, and an average of the minimum thicknesses Lmin at the cell flat portions is 150 µm. The ratio Lmax/Lmin is 2.7.

COMPARATIVE EXAMPLE #3

The alumina component layer as the first layer is not formed, and the HC adsorbent layer is coated directly on the monolithic support. The coated amount of the β-zeolite component layer of the HC adsorbent layer is set to 250 g/L. The exhaust gas purifying catalyst is prepared under the same conditions as EXAMPLE #14 except for the above.

An average of the maximum thicknesses Lmax at the cell corner portions of the HC adsorbent layer (second layer) in COMPARATIVE EXAMPLE #3 is 770 μm, and an average of the minimum thicknesses Lmin at the cell flat portions is 40 μm. The ratio Lmax/Lmin is 19.3.

Conditions for respective layers of the exhaust gas purifying catalysts prepared in above EXAMPLEs and COMPARATIVE EXAMPLEs are shown in Tables 1 and 2 of FIGS. 4 and 5.

Evaluations of the endurance test and the HC purifying characteristics (at A-bag of LA-4) of respective EXAMPLEs and COMPARATIVE EXAMPLEs are carried out under following conditions.

Figure 3:
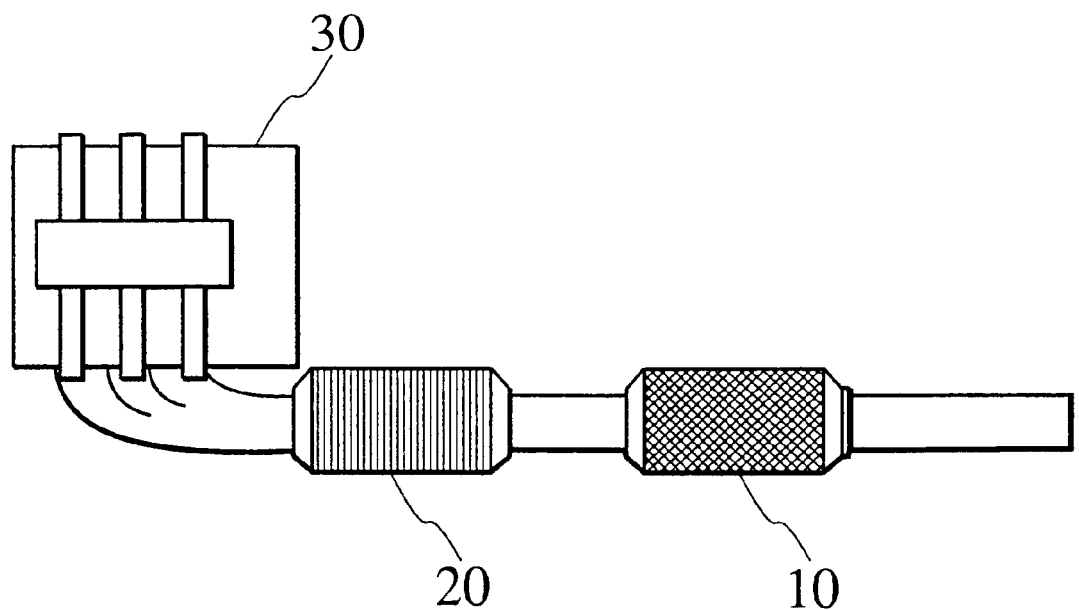
FIG. 3 is a view showing an arrangement of catalysts employed to evaluate the performance of the exhaust gas purifying catalyst according to the present embodiment.

FIG. 3 shows an arrangement of catalysts employed to evaluate the performance of the exhaust gas purifying catalyst according to the present embodiment. The normal three-way catalyst 20 is arranged on the downstream side of the exhaust gas from the engine 30, and then the exhaust gas purifying catalyst 10 of the present embodiment is arranged on the downstream side of the three-way catalyst 20.

[Endurance conditions]
  Engine exhaust amount: 3000 cc
  Fuel gasoline: No-lead gasoline
  Catalyst inlet gas temperature: 650° C.
  Test period (endurance time): 100 hours

[Performance evaluation conditions 1]
  Catalyst capacity for one engine bank:
    three-way catalyst (catalyst 10) 1.3 liter+HC adsorbing catalyst(catalyst 20 of the present invention) 1.3 liter
  Test vehicle: V type 6 cylinder 3.3 liter engine manufactured by Nissan Motor Co. Ltd.
  Carbon number of the hydrocarbons discharged in the engine start-up (contained in the catalyst inlet gas)
    C2-C3 21.0%
    C4-C6 33.0%
    C7-C9 40.0%

[Performance evaluation conditions 2]
  Engine exhaust amount: 2000 cc
  Fuel gasoline: No-lead gasoline
  Catalyst inlet exhaust gas temperature: 400° C.
  Stoichiometric atmosphere: Center A/F=14.6
    (Fluctuation ΔA/F=±1.0)

Results of the performance evaluation are shown in Table 3 of FIG. 6.

Average conversion rate (%) of HC, CO, and NOx in the stoichiometric atmosphere shown in Table 3 are decided based on following equations.

HC conversion rate (%)=([catalyst inlet HC concentration]−[catalyst outlet HC concentration])/[catalyst inlet HC concentration]×100

CO conversion rate (%)=([catalyst inlet CO concentration]−[catalyst outlet CO concentration])/[catalyst inlet CO concentration]×100

NOx conversion rate (%)=([catalyst inlet NOx concentration]−[catalyst outlet NOx concentration])/[catalyst inlet NOx concentration]×100

Based on the results of the catalyst performance evaluation in EXAMPLEs and COMPARATIVE EXAMPLEs, followings can be confirmed.

(1) Film Thickness of the Alumina Layer and the Zeolite Layer

In the exhaust gas purifying catalysts in EXAMPLEs #1 to #28, the alumina layer (first layer) is provided on the monolithic support, the zeolite layer (second layer) as the HC adsorbent layer is provided on the alumina layer, and the thickness of the zeolite layer is adjusted in a range of 10 to 650 μm such that a ratio Lmax/Lmin of the thickest portion (Lmax) of the zeolite layer at cell corner portions to the thinnest portion (Lmin) at cell flat portions is within a range of 1 to 10.

In contrast, in the exhaust gas purifying catalysts in COMPARATIVE EXAMPLEs #1 to #3, the alumina layer is not formed and thus the zeolite layer is formed directly on the monolithic support.

As apparent from the comparisons between EXAMPLE #1 and COMPARATIVE EXAMPLE #1, EXAMPLE #15 and COMPARATIVE EXAMPLE #2, or EXAMPLE #14 and COMPARATIVE EXAMPLE #3, it can be understood that the presence of the alumina layer has effects of reducing the Lmax/Lmin of the zeolite layer and uniformizing the thickness of the zeolite layer. This is because the alumina layer covers the cell corner portions thickly and brings the cell inner wall sectional shape close to the circular shape. In other words, the presence of the alumina layer can give such a structure that the thickness of the zeolite layer is more easily adjusted to proper ranges of 10 μm to 650 μm and the ratio of Lmax/Lmin is adjusted 1 to 10.

The zeolite layer whose thickness is adjusted to a proper thickness can control the diffusion (speed) of the exhaust gases that are passed through the cell and diffused into the metal-based catalyst layer and the HC adsorbent layer, and thus improve the cold HC purification performance.

In light of the results of above EXAMPLEs, it is more preferable that the ratio Lmax/Lmin of the zeolite layer should be set to 1 to 5 and also the thickness of the zeolite layer should be set to 50 μm to 300 μm.

(2) Zeolite type

The catalysts prepared by EXAMPLEs in which the β-zeolite having two type pore diameters and having the excellent durability is used as the main component of the HC adsorbent layer can have smaller distortion after the endurance time and can hold the wide pore distribution from the beginning to the end of the endurance time. Therefore, it can be understood that the adsorption/desorption characteristic can be improved rather than the prior art.

In addition, it can be understood that, like EXAMPLEs #6, #7, #8, if two types or more of zeolites are used as the HC adsorbent layer, the pore diameter distribution in the zeolite can be further extended and thus the cold HC adsorption rate can be improved.

(3) Optimization of the Metal-based Catalyst Layer

In the exhaust gas purifying catalysts in respective EXAMPLEs, either the Pd and Rh coexisting layer is provided on the HC adsorbent layer or the Pd layer is provided on the zeolite layer and then the Rh layer is provided thereon, and then Pt is added in either one layer or both layers.

The employment of Pd that is excellent in the HC activation at the low temperature enables the purification of the cold HC desorbed from the zeolite layer more effectively.

Since Rh is also contained in the Pd layer or the Rh layer is provided on the Pd layer, HC, CO, and NOx in the exhaust gases that are shifted to the atmosphere being slightly fuel-richer than the stoichiometric air-fuel ratio can be purified with good balance. As a result, the good conversion rate can be provided.

As can be seen from the comparison between EXAMPLE #1 and EXAMPLE #24, if an appropriate amount of the alkaline earth metal such as the barium carbonate, etc. is contained in the metal-based catalyst layer, sintering of the noble metal can be suppressed. Therefore, the low temperature activity and the purification performance can be improved further more.

As can be seen from the comparison between EXAMPLE #1 and EXAMPLE #23, in the EXAMPLE in which the La-Zr added cerium oxide and the La-Ce added zirconium oxide are contained in the metal-based catalyst layer, the desorbed cold HC can be purified effectively by the action of suppressing the degradation of Pd in the oxygen deficient atmosphere.

Moreover, in the catalysts in many EXAMPLEs, the poisoning resistance in the exhaust gases can be improved by adding Pt into the fourth layer.

The entire contents of Japanese Patent Applications P2000-23536 (filed Feb. 1, 2000), P2000-205382 (filed Jul. 6, 2000) and U.S. Pat. No. 6,047,544 are incorporated herein by reference.

Although the inventions have been described above by reference to certain embodiments of the invention, the inventions are not limited to the embodiments described above. Modifications and variations of the embodiments described above will occur to those skilled in the art in light of the above teaching.

What is claimed is:

1. An exhaust gas purifying catalyst, comprising:
   a monolithic support having plurality of cells each of which has a polygonal sectional shape;
   a first layer containing heat resisting inorganic material formed on the monolithic support, the first layer being configured to form inner wall sectional shapes of the cells into substantially circular shapes;
   a second layer containing hydrocarbon adsorbent formed on the first layer, wherein the first layer and the second layer are configured to obtain a ratio Lmax/Lmin of a thickest portion (Lmax) of the second layer at corner portions of the cells to a thinnest portion (Lmin) at flat portions of the cells being in a range of 1 to 10, and the second layer having a thickness of 10 to 650 $\mu$m; and
   a third layer containing a metal-based catalyst formed on the second layer.

2. The exhaust gas purifying catalyst of claim 1, further comprising:
   a fourth layer containing rhodium formed on the third layer.

3. The exhaust gas purifying catalyst of claim 1, wherein the second layer comprises zeolite as a main component, and the zeolite contains H-type β-zeolite whose Si/2Al ratio is 10 to 1500.

4. The exhaust gas purifying catalyst of claim 3, wherein the zeolite further comprises at least one type selected from the group consisting of MFI-type zeolite, Y-type zeolite, USY-type zeolite, and mordenite.

5. The exhaust gas purifying catalyst of claim 3, wherein the zeolite further comprises at least one element selected from the group consisting of palladium, magnesium, calcium, strontium, barium, silver, yttrium, lanthanum, cerium, neodymium, phosphorus, boron, and zirconium.

6. The exhaust gas purifying catalyst of claim 3, wherein the second layer further comprises a zirconium oxide containing rhodium and at least one type metal selected from the group consisting of cerium, neodymium, and lanthanum by 1 to 40 mol % in terms of metal.

7. The exhaust gas purifying catalyst of claim 2, wherein the third layer and/or the fourth layer comprise platinum.

8. The exhaust gas purifying catalyst of claim 1, wherein the third layer comprises,
   at least one type noble metal selected from the group consisting of palladium, platinum, and rhodium,
   alumina containing at least one type metal selected from the group consisting of cerium, zirconium, and lanthanum by 1 to 10 mol % in terms of metal, and
   cerium oxide containing at least one type metal selected from the group consisting of zirconium, neodymium, and lanthanum by 1 to 40 mol % in terms of metal.

9. The exhaust gas purifying catalyst of claim 1, wherein the third layer comprises,
   at least one type noble metal selected from the group consisting of palladium, platinum, and rhodium, and
   zirconium oxide containing at least one type metal selected from the group consisting of cerium and lanthanum by 1 to 10 mol % in terms of metal.

10. The exhaust gas purifying catalyst of claim 1, wherein cell numbers of the monolithic support is 100 to 1000/L.

11. An exhaust gas purifying catalyst, comprising:
    a monolithic support having a plurality of cells each of which has a polygonal sectional shape;
    a first layer containing heat resisting inorganic material formed on the monolithic support;
    a second layer containing hydrocarbon adsorbent formed on the first layer;
    a third layer containing a metal-based catalyst formed on the second layer,
    wherein, the first layer and the second layer are configured to obtain a ratio Lmax/Lmin of a thickest portion (Lmax) of the second layer at corner portions of the cells to a thinnest portion (Lmin) at flat portions of the cells being in a range of 1 to 10, and the second layer having a thickness of 10 to 650 $\mu$m.

12. The exhaust gas purifying catalyst of claim 1, wherein the first layer consists essentially of alumina.

13. The exhaust gas purifying catalyst of claim 1, wherein the ratio of a weight per unit volume of the first layer to a weight per unit volume of the second layer is 1/5 to 1.

* * * * *